United States Patent [19]

Decalonne

[11] 4,349,822
[45] Sep. 14, 1982

[54] INDUCTIVE POTENTIOMETER

[75] Inventor: Jacques Decalonne, Paris, France

[73] Assignee: Thomson-CSF, Paris, France

[21] Appl. No.: 134,337

[22] Filed: Mar. 26, 1980

[30] Foreign Application Priority Data

Mar. 28, 1979 [FR] France .............................. 79 07802

[51] Int. Cl.³ .......................................... G08C 19/48
[52] U.S. Cl. .............................. 340/870.34; 318/629;
318/632; 318/634; 340/870.42
[58] Field of Search ...................... 340/870.34, 870.32,
340/870.42, 870.43; 323/52, 53; 318/615, 629,
628, 690, 692, 632, 634

[56] References Cited

U.S. PATENT DOCUMENTS

| | | | |
|---|---|---|---|
| 3,011,119 | 11/1961 | Starks-Field et al. | 340/870.34 |
| 3,179,877 | 4/1965 | Godet | 323/52 |
| 4,037,147 | 7/1977 | Smith | 318/632 |
| 4,083,237 | 4/1978 | Levesque | 340/870.42 |
| 4,157,536 | 6/1979 | Gauthier | 340/870.32 |

FOREIGN PATENT DOCUMENTS 2105316  4/1972  France.

OTHER PUBLICATIONS

*Electro-Technology*, "Resolvers Classified for Selection", Lang, Feb. 1966, pp. 109-110.
*IEEE Transactions on Electronic Computers*, Broughton, pp. 359-362.

*Primary Examiner*—James J. Groody
*Attorney, Agent, or Firm*—Cushman, Darby & Cushman

[57] ABSTRACT

An inductive potentiometer for supplying a d.c. output voltage, which is linearly variable as a function of the rotation angle of a spindle. The potentiometer is constituted by a synchro-resolver and two associated circuits, an a.c. voltage supply circuit of one stator winding incorporating an oscillator whose amplitude is controlled by the supply voltage and an output circuit connected to the rotor which incorporates a demodulator stage. The linearization of the voltage as a function of the angular position of the spindle is ensured by a circuit shunt incorporating an amplifier whose gain is close to 0.5 controlling another stator winding. Temperature compensating windings can be included on the stator.

9 Claims, 4 Drawing Figures

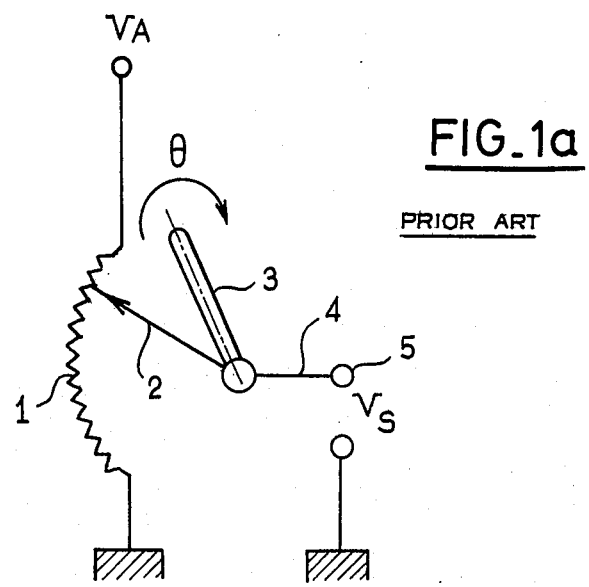
FIG_1a
PRIOR ART
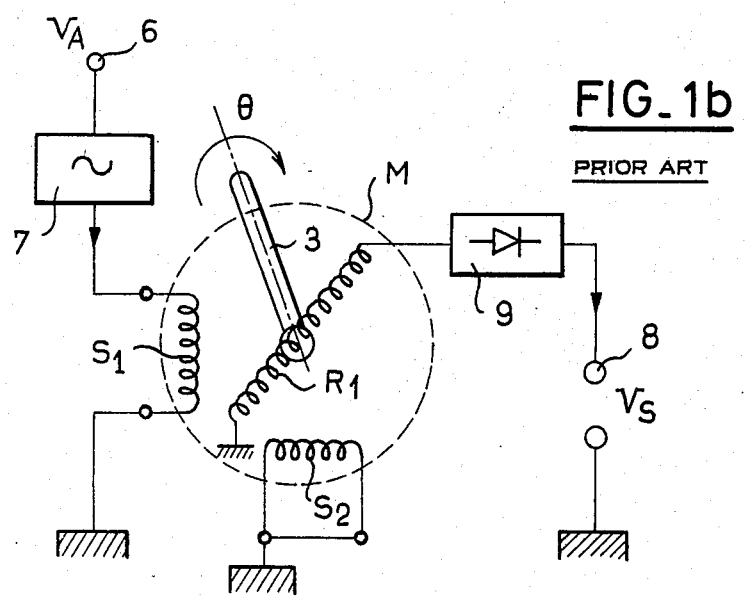
FIG_1b
PRIOR ART

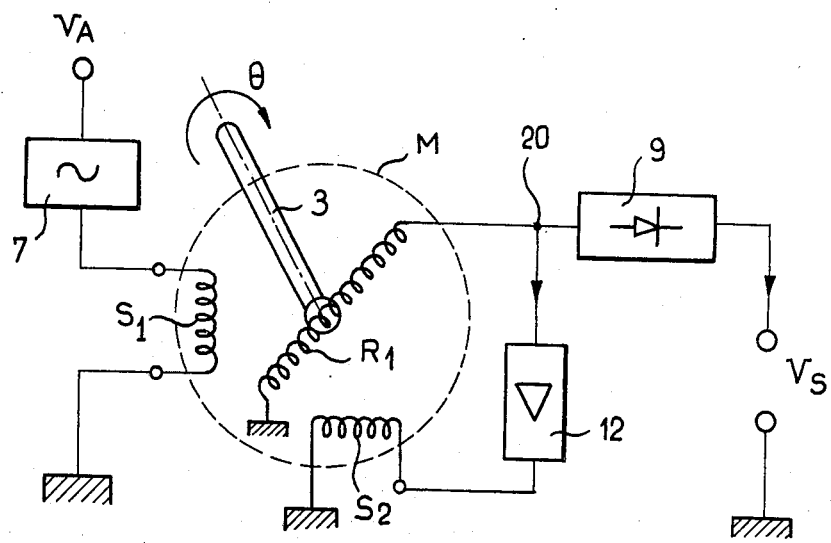
FIG_2
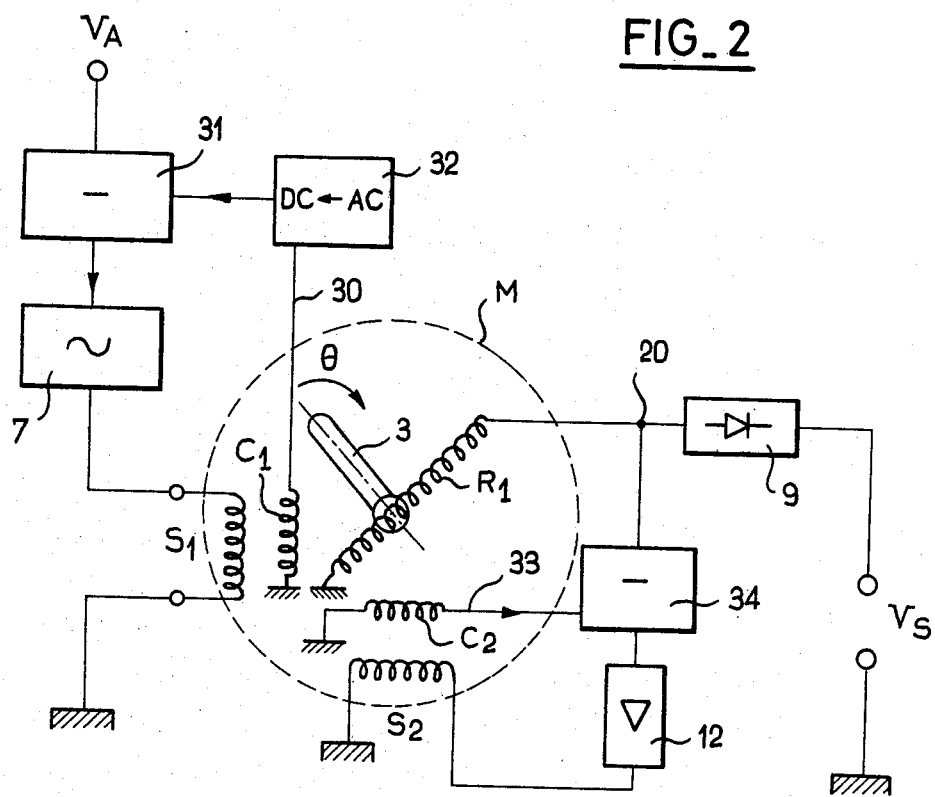
FIG_3

INDUCTIVE POTENTIOMETER

BACKGROUND OF THE INVENTION

The present invention relates to the field of devices for measuring the angular position of a rotating axis, known as angular pick-offs. These devices which supply the measured magnitude or quantity in the form of a direct current or voltage proportional to an angle are more particularly used in servomechanisms as position indicators.

The direct current angular pick-off are circular resistors having a moving slider, often called potentiometers and constituted by an either solid or coiled wire resistance track along which can move with gentle friction a conductive slider. The main defects of this type of pick-off are the wear to the track and the slider, the poor and erratic contacts determining arcs or parasitic disturbances and the mechanically hysteresis on changing the rotation direction.

For this reason, in applications where a high level of reliability and a long incident-free operation are sought, it has been proposed to use devices without components subject to mutual friction or contact and which operate by purely inductive coupling, which can vary as a function of the change in the angular position to be measured.

Certain of these known inductive devices are called resolvers. These are rotating machines having a stator and a rotor, both being constituted by a magnetic circuit and a pair of electrical windings defining two north - south magnetic axes at right angles. These machines can be used for numerous applications, for example the remote transmission of the angular position of the rotor thereof, the reception being ensured by an identical receiving machine, whereof the rotor restores the same position.

When the angular pick-off is operating a single winding of the stator and rotor is necessary, and for a given rotation angle of value $\theta$ the voltage induced in the rotor winding by an alternating voltage applied to the stator is linked with variations in the angle $\theta$.

The said induced voltage normally has to undergo a rectification in order to obtain the sought direct current voltage.

However, proportionality between the voltage and angle $\theta$ is only obtained for the small angular variations, the voltage supplied by a resolver-type pick-off being proportional to the trigonometric sine line of angle $\theta$.

In order to increase the proportionality range between the voltage and the rotation angle, it has been proposed to use the second winding normally present in the rotor of a synchro-resolver by collecting the alternating voltage induced at its terminals and, after amplification, applying it by a negative feedback loop in parallel to the primary supply winding. In order to obtain a suitable choice of the amplification gain, it is possible to increase the proportionality range or the linearization.

However, this solution involves the use of two rotor windings at an angle of 90°, requiring the costly and difficult construction of two identical windings defining two magnetic axes at precisely 90°. Moreover, the connecting in parallel of the output of one amplifier to a winding which is already connected to an alternating supply source leads to a complicated construction in order to prevent insulation problems.

BRIEF SUMMARY OF THE INVENTION

The inductive potentiometer according to the invention does not suffer from these disadvantages. Fundamentally, a rotating machine of the synchro-resolver type is used and, as in the prior art, a primary winding of the stator is energised. However, according to the invention, the second primary winding is also used and to this, after amplification is applied the electrical signal present at the terminals of one of the rotor windings. In this way, the desired proportionality between the rotation angle and the output voltage collected at the terminals of the same rotor winding is obtained whilst the other winding serves no useful purpose and can be omitted in the industrial construction of the synchro-resolver.

Thus, the invention provides the advantages of a simpler and consequently less expensive construction of both the rotating machine and the associated circuits. Furthermore, the separation of the functions of the two windings of the primary namely energising in one case and linearization in the other simplify the electrical insulation problems referred to hereinbefore.

More specifically, the invention relates to an inductive potentiometer which supplies, from a d.c. supply voltage a d.c. output voltage following a linear variation as a function of the rotation angle of the rotating spindle, wherein it is constituted on the one hand by a rotating machine of the synchro-resolver type having a stator and a rotor fixed to the rotating spindle, both of the said members being provided with a pair of windings, and on the other hand by the associated circuits, one of them incorporating an oscillator controlled by the supply voltage and connected to one winding of the stator and the other incorporating a demodulator stage connected to a winding of the rotor and supplying the d.c. output voltage, said linear variation being ensured by connecting the winding across an amplifier stage of given gain to the other winding of the stator.

BRIEF DESCRIPTION OF THE DRAWINGS

The invention is described in greater detail hereinafter relative to non-limitative embodiments and the attached drawings, wherein show:

FIG. 1 in two parts (a) and (b) a diagrammatic view of a resistive potentiometer and a synchro-resolver type inductive potentiometer according to the prior art.

FIG. 2 a diagrammatic view of an embodiment of an inductive potentiometer of the synchro-resolver type according to the invention.

FIG. 3 a constructional variant of the potentiometer of FIG. 2 using the compensation windings of the synchro-resolver.

BRIEF DESCRIPTION OF THE PREFERRED EMBODIMENTS

FIG. 1 shows in two parts (a) and (b) two prior art potentiometer types.

The resistive potentiometer shown in FIG. 1a comprises a resistor 1 on which can be displaced a moving contact or slider 2 fixed to the rotating spindle 3. A connection 4 connects the slider to an output terminal 5. During operation, the rotation of the spindle by an angle $\theta$, counted from an angular reference position, displaces the slider 2 on resistor 1 from which it collects only part. If a supply voltage $V_A$ is applied between the ends of the resistor, the voltage $V_F$ collected at terminal 5 will depend in linear manner on the variation of the rotation angle θ of the spindle and will vary between $V_A$ and 0. However, reference has been made hereinbefore to the disadvantages of such a resistive potentiometer.

The inductive potentiometer according to the prior art shown in FIG. 1b does not have these disadvantages. In this case, the resistance variation is replaced by a variation in the inductive coupling between a primary and a secondary, which on the one hand implies the conversion into a.c. voltage of the d.c. voltage supply $V_A$ and the demodulation of the variable a.c. voltage induced in order to obtain a d.c. output voltage $V_S$.

The inductive coupling device is a rotating machine known as a synchro-resolver incorporating a stator and a rotor wound with two pairs of windings respectively defining two magnetic axes at 90° from one another. It is utilized in an inductive potentiometer in the following manner. The input terminal 6 for the supply voltage $V_A$ is connected to one of the windings $S_1$ of the stator across a controlled amplitude oscillator circuit 7. The output terminal 8 is connected to one of the two windings $R_1$ of the rotor across a demodulation - filtering circuit 9. The second windings $S_2$ is not used and is connected in short-circuit for reasons of symmetry of the stator.

In operation, the supply voltage $V_A$ determines at the terminals of windings $S_1$ the application of an a.c. voltage $U_1$ which induces in the rotor winding $R_1$ a voltage $U_S$ dependent on the magnetic coupling between $S_1$ and $R_1$. This coupling is linked with the angle θ formed by the two windings and the voltage $U_S$, which can assume the value $U_0$ for maximum coupling, varies in accordance with the following relationship:

$$U_S = U_0 \sin\theta$$

Such an inductive potentiometer only satisfies the proportionality condition with very small variations of angle θ, which is a fundamental disadvantage in numerous applications.

FIG. 2 shows a first embodiment of an inductive potentiometer according to the invention. Compared with that of the prior art shown in FIG. 1 it is characterised by the use of the second stator winding $S_2$ at 90° from the first by connecting it to the winding $R_1$ of the rotor across an amplifier 12 of gain G.

In operation, the output voltage $U_S$ measured at terminal 20 of secondary $R_1$ is the resultant of the sum of the couplings with $S_1$ and $S_2$, i.e.:

$$U_S = U_1 \sin\theta + U_2 \cos\theta$$

with $U_2 = GU_S$
whence $$U_S = U_1 \frac{\sin\theta}{1 - G\cos\theta}$$

It can be seen that the device makes it possible to obtain a substantially linear output variation with a significant angle if G assumes a value close to −0.5. For example, for this value the error of proportionality or linearity is also ±0.1% for an angular variation of ±40° and ±1% for a range of ±60°.

Moreover, by optimizing the value of G as a function of the operating range, the results can be further improved. Thus, by optimizing the value G for a range of ±60° the error passes from ±1% for G=0.5 to ±0.04% for G=0.547.

In practice, a gain value chosen between 0.45 and 0.60 makes it possible to reduce the linearity error for most cases encountered in practical applications.

It should be noted that the potentiometer according to the invention utilizing a rotating machine can be used either on a continuous rotation basis over 360° where the linearity is only obtained over the indicated angular variation or with rotation or "displacement" limited to said variation. In the first case, the extraction of the signal created in the rotor is carried out with rings and collector brushes or with a rotary transformer, whereas in the second case flexible conductors connected to terminals fixed to the stator are used.

FIG. 3 is a constructional variant of the inductive potentiometer according to the invention using supplementary windings present on synchro-resolvers and known as compensation windings. Normally, these windings serve to compensate variations in the transformation ratio as a function of temperature variations.

Construction consists of injecting by a line 30 the signal of the windings ($C_1$) which is coupled to the supply winding $S_1$ of the stator into the latter winding across an adder stage 31. An "alternating - direct" conversion stage 32 is necessary to permit entry directly in parallel with the supply voltage.

Such a supplementary circuit makes it possible to bring about module control of the oscillator, as well as the stabilisation of the transformation ratio as a function of temperature variations. In the same way, the realisation of compensation winding $C_2$ at the output by line 33 and adder 34 provides the same advantages as regards precision and stability as in the input supply circuit.

It should be noted that all the circuits associated in this way with the synchro-resolver can be in the form of a single printed circuit with discrete components independent of the synchro-resolver.

However, according to a particularly advantageous embodiment, the printed circuit is included in the support panel of terminals of the rotating machine in such a way that it forms an interchangeable component with a conventional resistive potentiometer.

What is claimed is:

1. An inductive potentiometer to provide, from a d.c. supply voltage a d.c. output voltage following substantially a linear variation as a function of the rotation angle of a rotating spindle, comprising:
   a rotating machine of the synchro-resolver type, having a rotary variable coupling between first and second windings respectively mounted on a stator and a winding on a rotor, the rotor being fixed to said rotating spindle; and
   associated circuits including modulating means for converting said d.c. supply voltage into an a.c. voltage to supply the first stator winding, demodulating means for converting an a.c. voltage induced in said rotor winding into said d.c. output voltage; and
   means for providing said linear variation including an amplifier circuit of determined gain G for applying said a.c. rotor induced voltage to the second stator winding to multiply the output voltage by a reducing factor which varies in inverse relation to the gain and rotation angle, to ensure said linear variation.

2. An inductive potentiometer according to claim 1, further comprising first and second adder circuits, means for compensating for variations in temperature, including first and second compensating windings on the stator of the synchro-resolver, said first compensating winding being coupled to the said first stator winding and connected by said first adder circuit to the said modulating means, and said second compensating winding being coupled to the said second stator winding and connected to a first input of said second adder circuit, said second adder circuit receiving said a.c. induced voltage by a second input and being connected by its output to said amplifier circuit.

3. An inductive potentiometer according to claim 2, further including an alternating-direct converter circuit and a voltage controlled oscillator and wherein said first adder circuit has a first input connected to said first compensating winding through said alternating-direct converter circuit, a second input which receives the said d.c. supply voltage, and an output connected to said modulating means constituted by said voltage controlled oscillator.

4. An inductive potentiometer according to claim 1, wherein the synchro-resolver has only a single winding on the rotor.

5. An inductive potentiometer according to claim 1, wherein the gain of the amplifier circuit is in the range of 0.45 to 0.60.

6. An inductive potentiometer for providing a d.c. signal that is substantially a linear function of the rotation angle of a rotating spindle over a predetermined angular range, comprising:

a rotating machine of the synchro-resolver type, in which a rotary variable coupling between first and second windings respectively mounted on a stator and a winding on a rotor is produced, the rotor being fixed to the said rotating spindle; and associated circuits including modulating means for generating an a.c. signal for driving the first stator winding, demodulating means for converting an a.c. signal induced in the rotor winding into the d.c. output signal;

an amplifier circuit of determined gain for applying said a.c. induced signal to the second stator winding, for linearizing the function of the output signal; and first and second adder circuits and means for compensating for variations in temperature, including first and second compensating windings on the stator of the synchro-resolver, the first compensating winding being coupled to the said first stator winding and connected by the first adder circuit to the modulating means, and the second compensating winding being coupled to the second stator winding and connected to a first input of the second adder circuit, said second adder circuit receiving the a.c. induced signal by a second input and being connected by its output to the amplifier circuit.

7. An inductive potentiometer according to claim 6, further including an alternating-direct converter circuit and wherein the modulating means comprises a voltage controlled oscillator and wherein the first adder circuit has a first input connected to the first compensating winding through the alternating-direct converter circuit, a second input for receiving a d.c. supply voltage, and an output coupled to the voltage controlled oscillator.

8. An inductive potentiometer according to claim 6 or 7, wherein the synchro-resolver has only a single winding on the rotor.

9. An inductive potentiometer according to claim 6 or 7, wherein the gain of the amplifier circuit is in the range of 0.45 to 0.60.

* * * * *